(12) United States Patent
Xie et al.

(10) Patent No.: US 8,541,333 B2
(45) Date of Patent: Sep. 24, 2013

(54) CATALYST COMPONENT FOR OLEFIN POLYMERIZATION AND A CATALYST COMPRISING THE SAME

(75) Inventors: Lunjia Xie, Beijing (CN); Yongtai Ling, Beijing (CN); Yu Tian, Beijing (CN); Zaixing Feng, Beijing (CN); Siyuan Zhao, Beijing (CN); Qing Hu, Beijing (CN); Zhufang Sun, Beijing (CN); Yu Kang, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 280 days.

(21) Appl. No.: 12/856,175

(22) Filed: Aug. 13, 2010

(65) Prior Publication Data

US 2011/0040051 A1   Feb. 17, 2011

(30) Foreign Application Priority Data

Aug. 13, 2009 (CN) .......................... 2009 1 0162346
Feb. 10, 2010 (CN) .......................... 2010 1 0108066
Feb. 10, 2010 (CN) .......................... 2010 1 0108068

(51) Int. Cl.
| | |
|---|---|
| *B01J 31/00* | (2006.01) |
| *C08F 4/02* | (2006.01) |
| *C08F 4/44* | (2006.01) |
| *C08F 4/06* | (2006.01) |
| *C08F 2/00* | (2006.01) |
| *C08F 4/00* | (2006.01) |

(52) U.S. Cl.
USPC ........... 502/124; 502/123; 502/125; 502/127; 526/141; 526/147; 526/215; 526/217; 526/236

(58) Field of Classification Search
USPC ................ 507/127; 502/123, 124, 125, 127; 526/141, 147, 215, 217, 236
See application file for complete search history.

(56) References Cited

U.S. PATENT DOCUMENTS

| | | | |
|---|---|---|---|
| 4,784,983 A | 11/1988 | Mao et al. | |
| 6,020,279 A | 2/2000 | Uwai et al. | |
| 6,143,684 A * | 11/2000 | Morini et al. | 502/124 |
| 6,818,583 B1 * | 11/2004 | Morini et al. | 502/103 |
| 7,361,621 B2 | 4/2008 | Yang et al. | |
| 2006/0105906 A1 * | 5/2006 | Morini et al. | 502/115 |
| 2009/0171044 A1 | 7/2009 | Spencer | |

FOREIGN PATENT DOCUMENTS

| | | |
|---|---|---|
| CN | 85100997 | 1/1987 |
| CN | 1091748 | 9/1994 |
| CN | 1242780 | 1/2000 |
| CN | 1313869 | 9/2001 |
| CN | 1330086 | 1/2002 |
| CN | 1453298 | 11/2003 |
| CN | 1463990 | 12/2003 |
| CN | 1580136 | 2/2005 |
| CN | 1221573 | 10/2005 |
| CN | 1274724 | 9/2006 |
| CN | 1958621 | 5/2007 |
| CN | 101165074 | 4/2008 |
| CN | 101811983 | 8/2010 |
| EP | 0361494 | 4/1990 |
| WO | WO 99/11677 | 3/1999 |
| WO | WO 00/63261 | 10/2000 |
| WO | WO 02/30998 | 4/2002 |
| WO | WO 03/002617 | 1/2003 |

OTHER PUBLICATIONS

European Search Report for European Patent Application No. 10 17 2765, dated Dec. 16, 2010.
John G. Kirkwood et al., *Diffusion-Convection. A New Method for the Fractionation of Macromolecules*, Journal of the American Chemical Society, vol. 74, pp. 1056-1058 (Feb. 21, 1952).
Jean-Marie Bouvier et al., *Synthese De Modeles Monohanydride Succinique*, Bulletin de la Societe Chimique de France, vol. 9-10, No. 2, pp. 2189-2194 (1975).

* cited by examiner

*Primary Examiner* — David W Wu
*Assistant Examiner* — Elizabeth Eng
(74) *Attorney, Agent, or Firm* — Finnegan, Henderson, Farabow, Garrett & Dunner LLP

(57) ABSTRACT

A catalyst component for olefin polymerization comprising an α-cyanosuccinate compound as an internal electron donor, a catalyst comprising the catalyst component, and use of the catalyst in olefin polymerization. When used in propylene polymerization, the catalyst can exhibit good catalytic activity and good hydrogen response, and the resulting polymer can have a good isotacticity and a good molecular weight distribution.

21 Claims, No Drawings

CATALYST COMPONENT FOR OLEFIN POLYMERIZATION AND A CATALYST COMPRISING THE SAME

The present application claims the benefit of Chinese Patent Application No. 200910162346.0, filed on Aug. 13, 2009, Chinese Patent Application No. 201010108066.4; filed on Feb. 10, 2010, and Chinese Patent Application No. 201010108068.3, filed on Feb. 10, 2010.

The present disclosure relates to a catalyst component for olefin polymerization, a catalyst comprising the catalyst component, and use of the catalyst in olefin polymerization. For example, the present disclosure relates to a solid catalyst component for olefin polymerization comprising at least one α-cyanosuccinate compound as an internal electron donor, a catalyst comprising the catalyst component, and use of the catalyst in olefin polymerization.

It is well known in the art that a Ziegler-Natta catalyst comprises at least two components: a transition metal-containing active component, known also as main catalyst, which comprises generally a titanium compound or a vanadium compound on a magnesium dichloride support; and an organometallic compound comprising an element chosen from elements of Group IA to IIIA of the Periodic Table, known also as co-catalyst, which is generally an alkyl aluminum or an alkylaluminum halide. In some embodiments, such as in propylene polymerization, a third component is generally included to, for example, control the isotacticity of the product and/or enhance polymerization activity. The third component is generally a Lewis base, known also as electron donor compound. The electron donor introduced during the preparation of the solid main catalyst component is known as an internal electron donor, and the electron donor added together with the solid main catalyst component and the cocatalyst to the olefin polymerization system is known as an external electron donor.

Many compounds may be useful as the internal electron donor, such as aromatic diester compounds, including diisobutyl phthalate, disclosed in CN85100997 and U.S. Pat. No. 4,784,983, diether compounds disclosed in EP 361494, esters of diols disclosed in CN 1453298, 2,3-dihydrocarbyl-succinate compounds disclosed in CN1313869, and ω-cyano $C_2$-$C_5$ monocarboxylate compounds disclosed in CN1242780A.

Uses of combinations of different internal electron donor compounds in catalysts for olefin polymerization have also been known. See, e.g., WO03002617, CN101165074A, CN1958621A, CN1274724C, and CN1221573C.

The present disclosure provides certain catalyst components, such as solid catalyst components, prepared by using an α-cyanosuccinate compound of the formula (I) defined below as an internal electron donor. When used together with a cocatalyst and an external electron donor in olefin polymerization, the catalyst components can exhibit at least one of desired catalytic effects. For example, when used in propylene polymerization, the catalyst components can exhibit satisfactory catalytic effect. Furthermore, the α-cyanosuccinate compounds of the formula (I) can be prepared more easily and thus at a lower cost than the known 2,3-dialkylsuccinate compounds.

Disclosed herein is a catalyst component, such as a solid catalyst component, for olefin polymerization, comprising magnesium, titanium, at least one halogen, and at least one internal electron donor, wherein the at least one internal electron donor is chosen from α-cyanosuccinate compounds of formula (I) as defined below and combinations of at least one α-cyanosuccinate compound of formula (I) and at least one monofunctional or difunctional compound E chosen from esters other than the α-cyanosuccinate compounds of formula (I), ethers, ketones, ketals, amines and silanes.

Further disclosed herein is a catalyst for the polymerization of an olefin of formula $CH_2$=CHR, wherein R is chosen from hydrogen alkyl groups comprising from 1 to 6 carbon atoms, comprising a reaction product of (1) the catalyst component, such as the solid catalyst component, disclosed herein; (2) at least one alkyl aluminum compound; and (3) optionally, at least one external electron donor compound.

Even further disclosed herein is a process for polymerizing an olefin, comprising contacting, under polymerization conditions, at least one olefin of formula $CH_2$=CHR, wherein R is chosen from hydrogen and alkyl groups comprising from 1 to 6 carbon atoms, optionally at least one other olefin different from the olefin of formula $CH_2$=CHR as comonomer, and optionally at least one diene as a second comonomer, with the catalyst disclosed herein; and recovering the resulting polymer.

The term "polymerization" as used herein includes both homopolymerization and copolymerization. The term "polymer" as used herein includes homopolymer, copolymer and terpolymer.

As used herein, the term "catalyst component" means main catalyst component or procatalyst, which, may be used with a conventional cocatalyst such as an alkyl aluminum and an optional external electron donor, to provide a catalyst for olefin polymerization as disclosed herein.

Also disclosed herein is a catalyst component, such as a solid catalyst component, for olefin polymerization, comprising magnesium, titanium, at least one halogen, and at least one internal electron donor, wherein the at least one internal electron donor is chosen from α-cyanosuccinate compounds of formula (I):

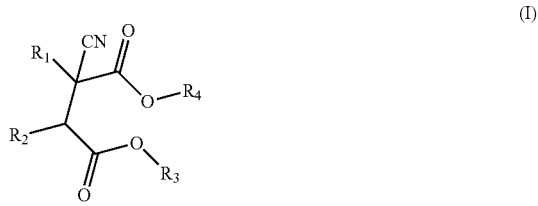

(I)

wherein: $R_1$ and $R_2$, which may be the same or different, are each chosen from hydrogen, $C_1$-$C_{14}$ linear alkyl groups, $C_3$-$C_{14}$ branched alkyl groups, $C_3$-$C_{10}$ cycloalkyl groups, $C_6$-$C_{10}$ aryl groups, $C_7$-$C_{10}$ alkaryl groups and $C_7$-$C_{10}$ aralkyl groups; and $R_3$ and $R_4$, which may be the same or different, are each chosen from $C_1$-$C_{10}$ linear alkyl groups, and $C_3$-$C_{10}$ branched alkyl groups, $C_3$-$C_{10}$ cycloalkyl groups, $C_6$-$C_{20}$ aryl groups, $C_7$-$C_{20}$ alkaryl groups and $C_7$-$C_{20}$ aralkyl groups, and combinations of at least one α-cyanosuccinate compound of formula (I) and at least one monofunctional or difunctional compound E chosen from esters other than the α-cyanosuccinate compounds of formula (I), ethers, ketones, ketals, amines, and silanes.

In an embodiment, the IR spectra of the catalyst components, such as solid catalyst components, disclosed herein have a characteristic absorption peak T in a range of from 2240 $cm^{-1}$ to 2345 $cm^{-1}$.

In another embodiment, the IR spectra of the catalyst components, such as solid catalyst components, disclosed herein have a characteristic absorption peak T in a range of from 2240 $cm^{-1}$ to 2295 $cm^{-1}$.

In an embodiment, the at least one internal electron donor is chosen from combinations of at least one α-cyanosuccinate compound of formula (I) and at least one monofunctional or difunctional compound E chosen from esters other than the α-cyanosuccinate compound of formula (I), ethers, ketones, ketals and silanes. In another embodiment, the at least one internal electron donor is chosen from combinations of at least one α-cyanosuccinate compound of formula (I) and at least one monofunctional or difunctional compound E chosen from esters other than the α-cyanosuccinate compound of formula (I), ethers, and silanes. In those embodiments, the at least one α-cyanosuccinate compound of formula (I) is present in an amount of from 5 mol % to 95 mol % of the combination, such as from 50 mol % to 95 mol % of the combination.

The catalyst component, such as the solid catalyst component, disclosed herein can, for example, be obtained by a process, comprising:

(1) dissolving a magnesium halide in a solvent system comprising at least one organic epoxy compound, at least one organophosphorus compound and at least one optional inert diluent, to form a solution A, such as a homogeneous solution A;

(2) combining the above solution A with at least one titanium compound and at least one auxiliary precipitant, to form a mixture B;

(3) precipitating solids C from the mixture B;

(4) separating solids D from the resulting product of (3); and (5) treating the solids D with at least one titanium compound in at least one inert organic solvent one or more times, to obtain the catalyst component, such as the solid catalyst component, disclosed herein, wherein the internal electron donor can be introduced at any stage before the separation of operation (4), wherein the molar ratio of the magnesium halide to the titanium compound to the internal electron donor, used in the process, may be, for example, 1-200:20-4000:1, such as 5-100:50-2000:1.

The homogeneous solution A can be prepared by dissolving a magnesium halide in a solvent system comprising an organic epoxy compound, an organophosphorus compound and an optional inert diluent as disclosed in, for example, CN85100997 and U.S. Pat. No. 4,784,983.

The term "magnesium halide" used in this process include magnesium halides and hydrates and alcohol complexes thereof. In an embodiment, the magnesium halide may be chosen from magnesium dihalides, magnesium dihalide hydrates, alcohol complexes of magnesium dihalides, derivatives of magnesium dihalides wherein one halogen atom in the magnesium dihalides is substituted with an alkoxy or a halogenated alkoxy, and mixtures thereof. For example, the magnesium halide may be chosen from magnesium dihalides, magnesium dihalide hydrates, and alcohol complexes of magnesium dihalides. The magnesium halide may be chosen, for example, from magnesium dichloride, magnesium dibromide, magnesium diiodium, and hydrates and alcohol complexes thereof.

In an embodiment, the solvent system used in operation (1) comprises at least one organic epoxy compound, at least one organophosphorus compound and at least one optional inert diluent.

Organic epoxy compound as disclosed herein may be chosen, for example, from aliphatic epoxy compounds and diepoxy compounds, halogenated aliphatic epoxy compounds and diepoxy compounds, aryl epoxy compounds, glycidyl ether, and inner ethers, comprising from 2 to 8 carbon atoms. For example, the organic epoxy compound may be chosen from epoxy ethane, epoxy propane, epoxy butane, vinyl epoxy ethane, butadiene dioxide, epoxy chloropropane, glycidyl methyl ether, diglycidyl ether, and tetrahydrofuran. In one embodiment, the organic epoxy compound is epoxy chloropropane. Those organic epoxy compounds may be used alone or in combination.

Organophosphorus compound as disclosed herein may be chosen, for example, from hydrocarbyl esters of orthophosphoric acid, halogenated hydrocarbyl esters of orthophosphoric acid, hydrocarbyl esters of phosphorous acid, and halogenated hydrocarbyl esters of phosphorous acid. For example, organophosphorus compounds as disclosed herein may be chosen from trimethyl orthophosphate, triethyl orthophosphate, tributyl orthophosphate, triphenyl orthophosphate, trimethyl phosphite, triethyl phosphite, tributyl phosphite and tribenzyl phosphate. In one embodiment, the organophosphorus compound is tributyl orthophosphate. Those organophosphorus compounds may be used alone or in combination.

Relative to one mole of the magnesium halide, the amount of the organic epoxy compound used may range, for example, from 0.2 to 10 moles, such as from 0.2 to 5 moles, and further such as from 0.5 to 2 moles, and the amount of the organophosphorus compound used may range, for example, from 0.1 to 3 moles, such as from 0.3 to 2 moles, and further such as from 0.7 to 1.2 moles.

The optional inert diluent disclosed herein for the dissolution of the magnesium halide and may be chosen, for example, from hexane, heptane, octane, decane, benzene, toluene, xylene, 1,2-dichloroethane, chlorobenzene, and other hydrocarbon and halogenated hydrocarbon solvents. Such inert diluents may be used alone or in combination. The amount of the inert diluent, if used, may range, for example, from 0.1 to 10 liters per mole of the magnesium halide, such as from 0.2 to 5 liters per mole of the magnesium halide, further such as from 1.2 to 2.4 liters per mole of the magnesium halide, and even further such as from 1.4 to 2.0 liters per mole of the magnesium halide.

In operation (1), the dissolving temperature can be determined by a person ordinarily skilled in the art depending on the solvent selected and the amount of the solvent used. In general, the dissolving temperature may range, for example, from 10° C. to 150° C., such as from 50° C. to 120° C. The upper limit of the dissolving temperature is generally not higher than the boiling point of the solvent.

In operation (2), the solution, such as homogeneous solution A, is combined with at least one titanium compound and at least one auxiliary precipitant, to form the mixture B. For example, the homogeneous solution A can be combined first with an auxiliary precipitant, and then with a titanium compound. Alternatively, the homogeneous solution A can, for example, be combined first with a titanium compound, and then with an auxiliary precipitant. The combination operation can be carried out at a temperature ranging, for example, from −50° C. to 0° C.

In operation (3), the mixture B may be slowly heated (for example, over about 0.5 to 3 hours) to a temperature, for example, of from 60° C. to 110° C., further such as 80° C., and upon the target temperature being reached, the mixture can be stirred further for a period of time, such as from 0.5 to 8 hours. During the heating and/or the stirring after the target temperature has been reached, solids C are precipitated. Then solids D are separated in operation (4). As used herein, "solids D" means solids comprising the at least one internal electron donor. In the embodiments where the at least one internal electron donor is introduced at a stage before the precipitation of solids C in operation (3) and no additional internal electron donor is introduced after the precipitation of solids C, the solids C can be the same as solids D.

The auxiliary precipitant may be chosen, for example, from organic anhydrides, organic acids, ethers, aldehydes, ketones, and esters as disclosed in CN85100997 and U.S. Pat. No. 4,784,983, such as phthalates. The α-cyanosuccinate compound of the formula (I) may also serve as the auxiliary precipitant. The molar ratio of the auxiliary precipitant to the magnesium halide may range, for example, from 0.03:1 to 1:1.

In operation (5), the solids D are treated with at least one titanium compound and at least one optional inert organic solvent, to form the catalyst component, such as the solid catalyst component, for olefin polymerization. The inert organic solvent may be chosen, for example, from hexane, heptane, octane, decane, benzene, toluene, and xylene. The treatment can be conducted, for example, according to the process disclosed in CN85100997 and U.S. Pat. No. 4,784, 983.

The titanium compound used in operation (2) and the titanium compound used in operation (5) may be the same or different, chosen, for example, from titanium compounds of formula $TiX_n(OR^5)_{4-n}$, wherein $R^5$, which may be the same or different, can each be chosen from $C_1$-$C_{20}$ hydrocarbyl groups, such as $C_1$-$C_{14}$ aliphatic hydrocarbyl groups, X, which may be the same or different, can each be chosen from F, Cl and Br, and n is an integer ranging from 1 to 4. The titanium compounds can be chosen, for example, from titanium tetrachloride, titanium tetrabromide, tetrabutoxy titanium, tetraethoxy titanium, triethoxy titanium chloride, diethoxy titanium dichloride, ethoxy titanium trichloride, and mixtures thereof. In one embodiment, the titanium compound is titanium tetrachloride. In certain embodiments, the same titanium compound can be used in operation (2) and in operation (5).

Relative to one mole of the magnesium halide, the amount of the titanium compound used in operation (2) may range, for example, from 1.5 to 50 moles, such as from 4 to 30 moles, and relative to one mole of the magnesium halide, the amount of the total titanium compound used in operation (2) and operation (5) may range, for example, from 2 to 150 moles, such as from 5 to 60 moles.

In the process, the internal electron donor may be added at any time before operation (4). For example, the internal electron donor may be added to the solution A, such as homogeneous solution A or the mixture B or the solids C. Furthermore, the internal electron donor may be added in one or more portions. The temperature for introducing the internal electron donor may range, for example, from 0° C. to 80° C., such as from 0° C. to 60° C. In one embodiment, the internal electron donor is added when the mixture B is heated to a temperature ranging from 0° C. to 60° C.

The catalyst component, such as the solid catalyst component, disclosed herein may comprise a reaction product of at least one magnesium halide-alcohol adduct, at least one titanium compound and the at least one internal electron donor, wherein the magnesium halide-alcohol adduct is of formula (II):

$$MgX_2 \cdot (ROH)_m \quad (II)$$

wherein: X is chlorine or bromine, such as chlorine; R, which may be the same or different, is chosen from $C_1$-$C_{12}$ alkyl groups, such as $C_1$-$C_4$ alkyl groups, $C_3$-$C_{10}$ cycloalkyl groups, and $C_6$-$C_{10}$ aryl groups, and m ranges from 1 to 5, such as from 1.5 to 3.5, The titanium compound is as described above.

In an embodiment, the molar ratio of the magnesium halide-alcohol adduct to the titanium compound to the internal electron donor, used in the reaction to form the catalyst component, such as solid catalyst component, in terms of Mg:Ti:internal electron donor is 1-200:20-4000:1, such as 5-100:50-2000:1.

The magnesium halide $MgX_2$ in the magnesium halide-alcohol adduct may be chosen, for example, from magnesium dichloride, magnesium dibromide, and mixtures thereof. In one embodiment, the magnesium halide $MgX_2$ in the magnesium halide-alcohol adduct is magnesium dichloride. The alcohol ROH in the magnesium halide-alcohol adduct may be chosen, for example, from methanol, ethanol, propanol, isopropanol, n-butanol, isobutanol, pentanol, isopentanol, n-hexanol, n-octanol, 2-ethylhexanol, ethylene glycol, and propylene glycol and mixtures thereof.

The magnesium halide-alcohol adduct of the formula (II) can be prepared by processes known in the art for preparing magnesium halide-alcohol adducts, such as spray drying process, spray cooling process, high-pressure extruding process, or high-speed stirring process.

In an embodiment, the magnesium halide-alcohol adduct of the formula (II) can be prepared by a process, comprising: adding the magnesium halide $MgX_2$, the alcohol ROH and an optional inert liquid medium to a closed vessel; allowing the ingredients to contact and react with each other under heating conditions, with the final reaction temperature being high enough such as reaching 100° C. to 140° C., to molten the magnesium halide-alcohol adduct to form a melt, thereby forming a mixture comprising the molten magnesium halide-alcohol adduct; applying high shearing action on the mixture comprising the molten magnesium halide-alcohol adduct; and then discharging the sheared mixture into a cooling medium to solidify the melt by quench, to form spherical magnesium halide-alcohol adduct particles. The application of the high shearing action may be accomplished by a conventional method, such as by a high-speed stirring process (see, for example, CN 1330086) or a spraying process (see, for example, U.S. Pat. No. 6,020,279), or through a supergravity rotary bed (see, for example, CN 1580136A) or an emulsification apparatus (see, for example, CN 1463990A). The inert liquid medium is generally an inert liquid aliphatic hydrocarbon solvent, chosen, for example, from kerosene, paraffin oil, vaseline oil, and white oil, and may optionally comprise at least one organic silicon compound and/or at least one surfactant, such as dimethyl silicone oil. The cooling medium may be at least one inert hydrocarbon solvent having a relatively low boiling point, chosen, for example, from pentane, hexane, heptane, gasoline, and petroleum ether, and may be controlled at a temperature of from −40° C. to 0° C., such as from −40° C. to −20° C., prior to its contacting with the magnesium halide-alcohol adduct melt.

The catalyst component, such as the solid catalyst component disclosed herein may be prepared by reacting the at least one particulate magnesium halide-alcohol adduct with the at least one titanium compound and the at least one internal electron donor.

In an embodiment, the catalyst component, such as the solid catalyst component, as disclosed herein, may be prepared by a process comprising:
(i) suspending the magnesium halide-alcohol adduct in the titanium compound or a mixture of the titanium compound and at least one inert solvent, which is chilled generally to a temperature, for example, ranging from −30° C. to 0° C., such as from −20° C. to −10° C.;
(ii) heating the above suspension to a temperature, for example, ranging from 40° C. to 130° C., such as from 60° C. to 120° C., and maintaining the temperature for a period of time ranging, for example, from 0.5 to 2.0 hours;

(iii) recovering a solid component through filtration; and
(iv) optionally, treating the recovered solid component with the titanium compound and the inert solvent one or more times, such as from 1 to 3 times,
wherein the internal electron donor is added in one or more portions at any time of operations (i) and (ii), such as when the suspension is heated to a temperature ranging from 0° C. to 60° C.

The inert solvent may be chosen, for example, from aliphatic hydrocarbons and aromatic hydrocarbons. The inert solvent may, for example, be chosen from hexane, heptane, octane, decane, and toluene.

The at least one internal electron donor in the catalyst component disclosed herein may be chosen from α-cyanosuccinate compounds of the formula (I):

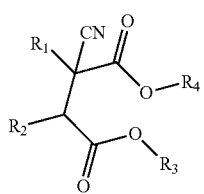

(I)

wherein; $R_1$ and $R_2$, which may be the same or different, are each chosen from hydrogen, $C_1$-$C_{14}$ linear alkyl groups, $C_3$-$C_{14}$ branched alkyl groups, $C_3$-$C_{10}$ cycloalkyl groups, $C_6$-$C_{10}$ aryl groups, $C_7$-$C_{10}$ alkaryl groups, and $C_7$-$C_{10}$ aralkyl groups; and $R_3$ and $R_4$, which may be the same or different, are each chosen from $C_1$-$C_{10}$ linear alkyl groups, $C_3$-$C_{10}$ branched alkyl groups, $C_3$-$C_{10}$ cycloalkyl groups, $C_6$-$C_{20}$ aryl groups, $C_7$-$C_{20}$ alkaryl groups, and $C_7$-$C_{20}$ aralkyl groups, and combinations of at least one α-cyanosuccinate compound of formula (I) and at least one monofunctional or difunctional compound E chosen from esters other than the α-cyanosuccinate compound of formula (I), ethers, ketones, ketals, amines and silanes.

In certain embodiments, $R_1$ and $R_2$ can have large steric hindrance and are each chosen, for example, from isopropyl, isobutyl, isopentyl, cyclopentyl, and cyclohexyl groups.

In one embodiment, in the formula (I), $R_1$ to $R_4$, which may be the same or different, are each chosen from $C_1$-$C_4$ linear alkyl groups, $C_3$-$C_4$ branched alkyl groups and $C_3$-$C_6$ cycloalkyl groups.

In another embodiment, in the formula (I), $R_1$ are $R_2$, which may be the same or different, are each chosen from methyl, ethyl, n-propyl, isopropyl, cyclopentyl and cyclohexyl groups; and $R_3$ are $R_4$, which may be the same or different, are each chosen from methyl, ethyl, n-butyl and 2-methyl propyl groups.

In yet another embodiment, in the formula (I), $R_1$ and $R_9$, which may be the same or different, are each chosen from methyl, ethyl, n-propyl, isopropyl, n-butyl, isobutyl, n-pentyl, isopentyl, n-hexyl, cyclopentyl, cyclohexyl, phenyl, benzyl, p-methylphenylmethyl, and phenylethyl groups; and $R_3$ and $R_4$, which may be the same or different, are each chosen from methyl, ethyl, n-propyl, isopropyl, n-butyl, isobutyl, phenyl, p-methylphenyl, o-methylphenyl, m-methyl phenyl, and benzyl groups.

The α-cyanosuccinate compounds of the formula (I) may be chosen, for example, from diethyl 2,3-diisopropyl-2-cyanosuccinate, di-n-butyl 2,3-diisopropyl-2-cyanosuccinate, diisobutyl 2,3-diisopropyl-2-cyanosuccinate, diethyl 2,3-di-cyclopentyl-2-cyanosuccinate, di-n-butyl 2,3-dicyclopentyl-2-cyanosuccinate, diisobutyl 2,3-dicyclopentyl-2-cyanosuccinate, diethyl 2,3-dicyclohexyl-2-cyanosuccinate, di-n-butyl 2,3-dicyclohexyl-2-cyanosuccinate, diisobutyl 2,3-dicyclohexyl-2-cyanosuccinate, diethyl 2-cyclopentyl-3-isopropyl-2-cyanosuccinate, 2,3-diisopropyl-2-cyanosuccinic acid 1-isobutyl ester 4-ethyl ester, 2,3-diisopropyl-2-cyanosuccinic acid 1-n-butyl ester 4-ethyl ester, diethyl 2-isopropyl-3-methyl-2-cyanosuccinate, diethyl 3-ethyl-2-isopropyl-2-cyanosuccinate, diethyl 2-isopropyl-3-propyl-2-cyanosuccinate, diethyl 3-butyl-2-isopropyl-2-cyanosuccinate, diethyl 2-isopropyl-3-phenyl-2-cyanosuccinate, diethyl 2-cyclohexyl-3-isopropyl-2-cyanosuccinate, and 2-isopropyl-3-phenyl-2-cyanosuccinic acid 1-ethyl ester 4-isobutyl ester.

In one embodiment, the α-cyanosuccinate compound is of formula (III):

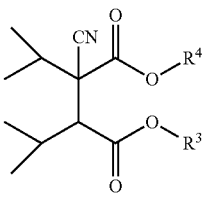

(III)

wherein: $R_3$ and $R_4$ are the same, and are each chosen from methyl, ethyl, butyl and isobutyl groups.

The α-cyanosuccinate compounds of the formula (I) may be prepared through processes known in the art. For example, J. Am. Chem. Soc. 1952, vol. 74, pp. 1056-1059 and Bull. Soc. Chico. Fr. 1975, (9-10, Pt. 2), pp. 2189-2194 disclose a process comprising alkylating a 3-alkyl-2-cyanosuccinate compound with 3 equivalents of a bromoalkane or an iodoalkane, to prepare a 2,3-dialkyl-2-cyanosuccinate compound. Chinese patent application No. 200910077779.6 discloses a process for the preparation of 2,3-diisopropyl-2-cyanosuccinate compounds of the formula (III), comprising reacting a 2-isopropyl-2-cyanoacetate with a metal alkoxide in an alcohol solvent; removing the alcohol solvent to give a concentrate; and reacting the concentrate with 2-bromo-2-isopropylacetate in an aprotic solvent. Those processes show that the α-cyanosuccinate compounds of the formula (I) may be more easily prepared in industrial scale than 2,3-dihydrocarbylsuccinate compounds. For example, 2,3-diisopropyl-2-cyanosuccinate compounds of the formula (III) may be more easily prepared in industrial scale than the known 2,3-diisopropyl-succinate compounds.

As mentioned above, the internal electron donor may be chosen from combinations of at least one α-cyanosuccinate compound of formula (I) and at least one monofunctional or difunctional compound E chosen from esters other than the α-cyanosuccinate compound of formula (I), ethers, ketones, ketals, amines and silanes. The monofunctional or difunctional compound E may, for example, be chosen from esters of mono- and poly-carboxylic acids, diether compounds, and difunctional compounds comprising both an ether group and an ester group.

The esters of mono- and poly-carboxylic acids may be chosen, for example, from benzoates, phthalates, malonates (for example, 2,2-dihydrocarbyl malonates), succinates (for example, 2,3-dihydrocarbyl succinates), glutarates, pivalates, adipates, sebacates, maleates, naphthalene dicarboxylates, trimellitates, benzene-1,2,3-tricarboxylates, pyromellitates and carbonates. Examples include ethyl benzoate, diethyl phthalate, di-iso-butyl phthalate, di-n-butyl phthalate, di-isooctyl phthalate, di-n-octyl phthalate, diethyl malonate, dibutyl malonate, diisobutyl malonate, diethyl 2,3-di-isopropylsuccinate, di-isobutyl 2,3-di-isopropylsuccinate, diethyl 2,2-diisobutyl malonate, di-n-butyl 2,2-di-isobutyl malonate, di-isobutyl 2,2-diisobutyl malonate, di-n-butyl 2,3-diisopropylsuccinate, dimethyl 2,3-di-isopropylsuccinate, di-iso-butyl 2,2-dimethylsuccinate, di-iso-butyl 2-ethyl-2-methylsuccinate, diethyl 2-ethyl-2-methylsuccinate, diethyl adipate, dibutyl adipate, diethyl sebacate, dibutyl sebacate, diethyl maleate, di-n-butyl maleate, diethyl naphthalene dicarboxylate, dibutyl naphthalene dicarboxylate, triethyl trimellitate, tributyl trimellitate, triethyl benzene-1,2,3-tricarboxylate, tributyl benzene-1,2,3-tricarboxylate, tetraethyl pyromellitate, and tetrabutyl pyromellitate. In one embodiment, the esters of mono- and polycarboxylic acids are chosen from esters of aromatic carboxylic acids and esters of aliphatic dicarboxylic acids, such as diisobutyl phthalate and di-n-butyl phthalate.

The diether compounds may, for example, be chosen from 1,3-diether compounds of the formula (IV):

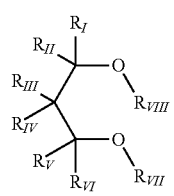

(IV)

wherein: $R_I$, $R_{II}$, $R_{III}$, $R_{IV}$, $R_V$, and $R_{VI}$, which may be the same or different, are each chosen from hydrogen, halogens, linear $C_1$-$C_{20}$ alkyl groups, $C_3$-$C_{20}$ branched alkyl groups, $C_3$-$C_{20}$ cycloalkyl groups, $C_6$-$C_{20}$ aryl groups, $C_7$-$C_{20}$ alkaryl groups, and $C_7$-$C_{20}$ aralkyl groups; $R_{III}$ and $R_{IV}$ are optionally linked to each other to form a ring; $R_{VII}$ and $R_{VIII}$, which may be the same or different, are each chosen from linear $C_1$-$C_{20}$ alkyl groups, $C_3$-$C_{20}$ branched alkyl groups and $C_3$-$C_{20}$ cycloalkyl groups. The 1,3-diether compound may be chosen, for example, from 9,9-bis(methoxymethyl)fluorene and 2-isopentyl-2-isopropyl-1,3-dimethoxypropane.

The difunctional compound comprising both an ether group and an ester group may be chosen, for example, from o-alkoxybenzoates, m-alkoxybenzoates, and p-alkoxybenzoates. For example, the difunctional compound may be chosen from o-methoxybenzoates, such as ethyl o-methoxybenzoate, propyl o-methoxybenzoate, isopropyl o-methoxybenzoate, n-butyl o-methoxybenzoate, and isobutyl o-methoxybenzoate.

Further disclosed herein is a catalyst for the polymerization of at least one olefin of formula $CH_2=CHR^6$, wherein $R^6$ is chosen from hydrogen and alkyl groups comprising from 1 to 6 carbon atoms, comprising a reaction product of the following components:
(1) the catalyst component such as the solid catalyst component disclosed herein;
(2) at least one alkylaluminum compound as a cocatalyst; and
(3) optionally, at least one external electron donor compound, as disclosed herein.

The alkyl aluminum compounds useful as cocatalysts are well-known to a person skilled in the art. The alkyl aluminum compounds may, for example, be chosen from those of formula $AlR^7_{3-a}X^1_a$, wherein $R^7$, which may be the same or different, is chosen from hydrogen $C_1$-$C_{20}$ hydrocarbyl groups, such as $C_1$-$C_8$ alkyl groups; X, which may be the same or different, is each chosen from halogens, such as chloride; and a has a value ranging from 0 to 2. The alkyl aluminum compound may be chosen, for example, from trialkyl aluminums, such as trimethyl aluminum, triethyl aluminum, triisobutyl aluminum, tri-n-butyl aluminum, tri-n-hexyl aluminum, trioctyl aluminum; alkyl aluminum hydrides, such as diethyl aluminum hydride, diisobutyl aluminum hydride; and alkyl aluminum chlorides, such as diethyl aluminum chloride, di-isobutyl aluminum chloride, ethyl aluminum sesquichloride, ethyl aluminum dichloride. In one embodiment, the alkyl aluminum compound is chosen from triethyl aluminum and triisobutyl aluminum. The alkyl aluminum compound may, for example, be used in such an amount that the molar ratio of aluminum therein to titanium in the catalyst component ranges from 5:1 to 5000:1, such as from 50:1 to 1000:1.

The optional external electron donor compound may be chosen from those well-known by a person skilled in the art. The external electron donor compounds may be chosen, for example, from carboxylic anhydrides, carboxylic esters, ketones, ethers, lactones, organophosphorus compounds and organic silicon compounds. In one embodiment, the optional external electron donor compound is chosen from organic silicon compounds. If used, the external electron donor compound is used in an amount ranging from 0.005 to 0.5 moles, such as from 0.01 to 0.25 moles, and further such as from 0.02 to 0.1 moles, relative to one mole of the alkyl aluminum compound.

The external electron donor compounds may, for example, be chosen from silicon compounds of formula $R^8_aR^9_bSi(OR^{10})_c$, wherein a and b, which may be the same or different, are each an integer ranging from 0 to 2, c is an integer ranging from 1 to 3, and the sum of (a+b+c) is 4; $R^8$, $R^9$ and $R^{10}$, which may be the same or different, are each chosen from $C_1$-$C_{18}$ hydrocarbyl groups, such as $C_1$-$C_4$ linear alkyl groups and branched $C_3$-$C_4$ alkyl groups, and $C_5$-$C_6$ cycloalkyl groups, optionally comprising at least one heteroatom. In one embodiment, the silicon compounds are chosen from those of formula $R^8_aR^9_bSi(OR^{10})_c$, wherein a is 1, b is 1, c is 2, at least one of $R^8$ and $R^9$ is chosen from branched alkyl, alkenyl, alkylene, cycloalkyl having from 3 to 10 carbon atoms, and aryl groups comprising from 3 to 10 carbon atoms and optionally comprising at least one heteroatom, and $R^{10}$ is chosen from $C_1$-$C_{10}$ alkyl groups, such as a methyl group. The silicon compounds may be chosen, for example, from cyclohexyl methyl dimethoxy silane, diisopropyl dimethoxy silane, di-n-butyl dimethoxy silane, di-iso-butyl dimethoxy silane, diphenyl dimethoxy silane, methyl tert-butyl dimethoxy silane, dicyclopentyl dimethoxy silane, 2-ethylpiperidino tert-butyl dimethoxy silane, 1,1,1-trifluoro-2-propyl 2-ethylpiperidino dimethoxy silane and 1,1,1-trifluoro-2-propyl methyl dimethoxy silane. In another embodiment, the silicon compounds are chosen from those of formula $R^8_aR^9_bSi(OR^{10})_c$, wherein a is 0, b is 1, c is 3, $R^9$ is chosen from branched alkyl and cycloalkyl groups optionally comprising at least one heteroatom, and $R^{10}$ is a methyl group. The silicon compounds may be chosen, for example, from cyclohexyl trimethoxy silane, tert-butyl trimethoxy silane, and tert-hexyl trimethoxy silane.

The external electron donor compounds may be chosen, for example, from the aforementioned 1,3-diether compounds of the formula (IV), such as 2-isopentyl-2-isopropyl-1,3-dimethoxypropane and 9,9-bis(methoxymethyl)fluorene.

The alkyl aluminum compound and the optional external electron donor compound can contact and/or react with the catalyst component separately or as a mixture.

The catalyst disclosed herein can be useful, for example, in the polymerization of olefin $CH_2=CHR^6$ (wherein $R^6$ is chosen from hydrogen and alkyl group comprising from 1 to 6 carbon atoms) or a feed comprising the olefin and a small amount of diene, if necessary.

Even further disclosed is a process for polymerizing at least one olefin, comprising contacting at least one olefin of formula $CH_2=CHR^6$, wherein $R^6$ is chosen from hydrogen and alkyl groups comprising from 1 to 6 carbon atoms, optionally at least one other olefin different from that of formula $CH_2=CHR^6$ as a comonomer, and optionally at lest one diene as a second comonomer, with the catalyst disclosed herein under polymerization conditions; and recovering the resulting polymer.

The polymerization of at least one olefin may be carried out, for example, in liquid phase of liquid monomer or a solution of monomer in an inert solvent, or in gas phase, or in a combination of gas phase and liquid phase, according to the known processes. The polymerization is generally carried out at a temperature of, for example, from 0° C. to 150° C., such as from 60° C. to 100° C., and at, for example, normal or higher pressure. In the polymerization, hydrogen as a regulator of polymer molecular weight may be added to the polymerization reactor to adjust the molecular weight and melt index of the polymer.

When used in olefin polymerization, such as in propylene polymerization, the catalyst components, such as solid catalyst components, disclosed herein, comprising the α-cyanosuccinate of the formula (I) as the internal electron donor, can exhibit good catalytic activities and good hydrogen response, and the resultant polymers can have high isotactic indices and broad molecular weight distribution. Due to its easy synthesis, the α-cyanosuccinate of the formula (I) can be obtained at a low cost.

EXAMPLES

The following examples are provided to further illustrate the present disclosure and by no means are intended to limit the scope thereof.

Testing Methods:

1. Melt index of polymers was measured according to ASTM D1238-99, at 230° C. and 2.16 kg load.

2. Isotacticity of polymers was measured by heptane extraction method carried out as follows: 2 g of dry polymer sample was extracted with boiling heptane in an extractor for 6 hours, then the residual substance was dried to a constant weight, and the ratio of the weight of the residual polymer (g) to 2 (g) was calculated as isotacticity.

3. Molecular weight and molecular weight distribution (MWD=Mw/Mn) of polymers were measured by a GPC process carried out on PL-GPC220, solvent: trichlorobenzene, temperature: 150° C., standard sample: polystyrene, flow rate: 1.0 ml/min, column: 3× Plgel 10 μm MIXED-B 300×7.5 mm.

4. IR spectrum analysis of the catalyst component: A sample of the catalyst component was ground under nitrogen atmosphere in liquid paraffin to form a paste, and then the paste was sandwiched between potassium bromide sheets and analyzed. The IR spectra were acquired on Nicolet Nexus 470 Fourier transform infrared spectrometer from Thermo Fisher Scientific Inc., USA, with the scanning times being 16 and the resolution power being 4.

5. Wavelength dispersive X-ray fluorescence spectrum (WDXRF) analysis of the catalyst components: performed on PW4400/40 of Sequential Spectrometer System AXIOS from PANalytical B. V., Netherlands.

In the examples, the following propylene polymerization procedures were used:

Propylene Polymerization Procedure I:

At room temperature, to a 5 L autoclave, in which air had been completely replaced with gaseous propylene, were added with 5 ml of a 0.5 M solution of triethyl aluminum in hexane, 1.25 ml of a 0.1M solution of cyclohexyl methyl dimethoxy silane (CHMMS) in hexane, and 10 mg of a solid catalyst component suspended in 10 ml of hexane. Then to the autoclave were introduced 1 L (standard volume) of hydrogen gas and 2.3 L of liquid propylene, and the ingredients were heated to 70° C. within 10 min with stirring. Polymerization was allowed to continue for 1 hour at 70° C. The autoclave was cooled, and then the pressure was vented. The autoclave was opened and polypropylene resin was recovered.

Propylene Polymerization Procedure II:

Propylene polymerization was carried out in the same manner as described in the propylene polymerization procedure I, except that the amount of the hydrogen gas was changed to 6 L (standard volume).

Example 1

To a reactor, in which air had been repeatedly replaced with high pure $N_2$, were charged successively with 4.8 g of anhydrous magnesium dichloride, 95 ml of toluene, 4 ml of epoxy chloropropane, and 12.5 ml of tributyl phosphate (TBP). The reaction mixture was heated with stirring to 50° C. and maintained at that temperature for 2.5 hours to dissolve the solids. To the reactor was added with 1.4 g of phthalic anhydride, and the reaction mixture was allowed to react for 1 hour and then cooled to −25° C. 56 milliliters of $TiCl_4$ were added dropwise thereto within 1 hour, then the reaction mixture was heated slowly to 80° C. over 2 hours, and particulate solids precipitated gradually during the heating. 5 mmol of diethyl 2,3-diisopropyl-2-cyanosuccinate was added to the reactor, the reaction mixture was maintained at 80° C. for 1 hour, and then the mother liquid was filtered off. The residual solids were washed with toluene (70 ml×2). 40 milliliters of titanium tetrachloride and 60 milliliters of toluene were added thereto, the reaction mixture was stirred at 100° C. for 2 hours, and then the mother liquid was filtered off. The titanium tetrachloride treatment was repeated once. The solids were washed with boiling toluene (60 ml×3), boiling hexane (60 ml×2), and hexane at ambient temperature (60 ml×2), and then dried under vacuum, to obtain a solid titanium-containing catalyst component.

IR spectrum data of the solid catalyst component ($cm^{-1}$): 2291, 1862, 1698, 1460, 1377, 1298, 1013.

WDXRF analysis results of the solid catalyst component: Mg: 23.7 wt %, Cl: 74.5 wt %, Ti: 1.6 wt %, and other elements: the balance.

Propylene polymerization was carried out according to the propylene polymerization procedure I. The results are shown in Table 1 below.

Comparative Example 1

A solid catalyst component was prepared according to the procedure described in Example 1, except that the diethyl 2,3-diisopropyl-2-cyanosuccinate (5 mmol) was replaced with diisobutyl phthalate (5 mmol).

IR spectrum data of the solid catalyst component (cm$^{-1}$): 1860, 1686, 1460, 1378, 1084.

WDXRF analysis results of the solid catalyst component: Mg: 25.2 wt %, Cl: 72.9 wt %, Ti: 1.8 wt %, and other elements: the balance.

Propylene polymerization was carried out according to the propylene polymerization procedure I. The results are shown in Table 1.

Example 2

A solid catalyst component was prepared according to the procedure described in Example 1, except that the diethyl 2,3-diisopropyl-2-cyanosuccinate (5 mmol) was replaced with 2,3-diisopropyl-2-cyanosuccinic acid 1-isobutyl ester 4-ethyl ester (5 mmol).

Two propylene polymerizations were carried out according to the propylene polymerization procedures I and II, respectively. The results are shown in Table 1.

Example 3

A solid catalyst component was prepared according to the procedure described in Example 1, except that the diethyl 2,3-diisopropyl-2-cyanosuccinate (5 mmol) was replaced with diethyl 2-isopropyl-3-methyl-2-cyanosuccinate (5 mmol).

Propylene polymerization was carried out according to the propylene polymerization procedure I. The results are shown in Table 1.

Example 4

A solid catalyst component was prepared according to the procedure described in Example 1, except that the diethyl 2,3-diisopropyl-2-cyanosuccinate (5 mmol) was replaced with diethyl 3-ethyl-2-isopropyl-2-cyanosuccinate (5 mmol).

Propylene polymerization was carried out according to the propylene polymerization procedure I. The results are shown in Table 1.

Example 5

A solid catalyst component was prepared according to the procedure described in Example 1, except that the diethyl 2,3-diisopropyl-2-cyanosuccinate (5 mmol) was replaced with diethyl 3-isopropyl-2-cyclopentyl-2-cyanosuccinate (5 mmol).

Propylene polymerization was carried out according to the propylene polymerization procedure I. The results are shown in Table 1.

Example 6

A solid catalyst component was prepared according to the procedure described in Example 1, except that the diethyl 2,3-diisopropyl-2-cyanosuccinate (5 mmol) was replaced with diethyl 2,3-diisopropyl-2-cyanosuccinate (2.5 mmol) and diisobutyl phthalate (2.5 mmol).

WDXRF analysis results of the solid catalyst component: Mg: 26.8 wt %, Cl: 71.6 wt %, Ti: 1.3 wt %, and other elements: the balance.

IR spectrum data of the solid catalyst component (cm$^{-1}$): 2286, 1860, 1694, 1460, 1377, 1314, 1154, 1082.

Two propylene polymerizations were carried out according to the propylene polymerization procedures I and II, respectively. The results are shown in Table 1.

Example 7

A solid catalyst component was prepared according to the procedure described in Example 1, except that the diethyl 2,3-diisopropyl-2-cyanosuccinate (5 mmol) was replaced with diethyl 2,3-diisopropyl-2-cyanosuccinate (2.5 mmol) and 9,9-bis(methoxymethyl)fluorene (2.5 mmol).

IR spectrum data of the solid catalyst component (cm$^{-1}$): 2340, 1858, 1684, 1460, 1377, 1316, 1296, 1083.

Two propylene polymerizations were carried out according to the propylene polymerization procedures I and II, respectively. The results are shown in Table 1.

Example 8

A solid catalyst component was prepared according to the procedure described in Example 1, except that the diethyl 2,3-diisopropyl-2-cyanosuccinate (5 mmol) was replaced with di-n-butyl 2,3-diisopropyl-2-cyanosuccinate (5 mmol).

IR spectrum data of the solid catalyst component (cm$^{-1}$): 2290, 1862, 1698, 1460, 1377, 1295, 1268, 1053.

Two propylene polymerizations were carried out according to the propylene polymerization procedures I and H, respectively. The results are shown in Table 1.

Comparative Example 2

A solid catalyst component was prepared according to the procedure described in Example 1, except that the diethyl 2,3-diisopropyl-2-cyanosuccinate (5 mmol) was replaced with ethyl 2-isopropyl-2-cyanoacetate (5 mmol).

IR spectrum data of the solid catalyst component (cm$^{-1}$): 2294, 1863, 1701, 1460, 1377, 1316, 1269, 1037.

Two propylene polymerizations were carried out according to the propylene polymerization procedures I and II, respectively. The results are shown in Table 1.

TABLE 1

Performance of the Catalysts

| Example No. | Poly-merization Procedure | Polymerization Activity (kgPP/gcat.) | Polymer Isotacticity (%) | Polymer Melt Index (g/10 min) | MWD |
|---|---|---|---|---|---|
| Example 1 | I | 17.6 | 97.8 | 3.7 | 10.6 |
| Comparative Example 1 | I | 19.3 | 98.3 | 27.6 | 5.6 |
| Example 2 | I | 23.0 | 97.5 | 1.8 | 8.8 |
|  | II | 19.0 | 97.5 | 4.0 | 9.9 |
| Example 3 | I | 1.4 | 90.7 | 89.3 | 7.7 |
| Example 4 | I | 3.6 | 93.0 | 52.4 | 9.4 |
| Example 5 | I | 9.6 | 96.1 | 4.4 | 11.9 |
| Example 6 | I | 16.4 | 97.4 | 4.1 | 9.5 |
|  | II | 11.4 | 97.6 | 25.2 | 8.6 |
| Example 7 | I | 16.0 | 97.4 | 15.4 | 6.1 |
|  | II | 10.5 | 96.7 | 42.4 | 5.7 |
| Example 8 | I | 48.2 | 96.4 | 3.3 | 9.6 |
|  | II | 14.6 | 95.4 | 10.7 | 10.0 |
| Comparative Example 2 | I | 3.8 | 87.8 | 38.4 | 9.0 |
|  | II | 3.0 | 87.5 | 45.9 | 9.3 |

It can be seen from the data shown in Table 1 that the catalysts of the examples in accordance with the present disclosure exhibited overall good performance, compared to the known catalysts, for propylene polymerization hydrogen response, polymer isotacticities, and polymer molecular weight distribution.

Example 9

A spherical magnesium dichloride-alcohol adduct of formula MgX$_2$·(ROH)$_m$, wherein X=Cl, R=C$_2$H$_5$, and m=2.4, was prepared according to the process described in Example 1 of Chinese patent application CN1091748A.

To a 300 ml jacketed glass reactor was charged 100 ml of titanium tetrachloride, and the contents were cooled to −20° C. 8 g of the above spherical magnesium dichloride-alcohol adduct were added thereto, and the contents were heated to 100° C., with 5 mmol of diethyl 2,3-diisopropyl-2-cyanosuccinate being added thereto during the heating. The reaction mixture was maintained at 100° C. for 1 hour, and then the liquid was filtered off. The residual solids were washed with titanium tetrachloride twice and with hexane four times, and then dried under vacuum, to provide a spherical solid catalyst component.

IR spectrum data of the solid catalyst component ($cm^{-1}$): 2291, 1704, 1460, 1378, 1298, 1266, 1007.

WDXRF analysis results of the solid catalyst component: Mg: 22.9 wt %, Cl: 73.8 wt %, Ti: 3.1 wt %, other elements: the balance.

Two propylene polymerizations were carried out according to the propylene polymerization procedures I and II, respectively. The results are shown in Table 2 below.

Comparative Example 3

A spherical solid catalyst component was prepared according to the procedure described in Example 9, except that the diethyl 2,3-diisopropyl-2-cyanosuccinate was replaced with diisobutyl phthalate (5 mmol).

IR spectrum data of the solid catalyst component ($cm^{-1}$): 1860, 1687, 1460, 1377, 1083.

WDXRF analysis results of the solid catalyst component: Mg: 23.4 wt %, Cl: 74.5 wt %, Ti: 2.0 wt %, and other elements: the balance.

Two propylene polymerizations were carried out according to the propylene polymerization procedures I and II, respectively. The results are shown in Table 2.

Example 10

A spherical solid catalyst component was prepared according to the procedure described in Example 9, except that the diethyl 2,3-diisopropyl-2-cyanosuccinate was replaced with diethyl 2-isopropyl-3-methyl-2-cyanosuccinate (5 mmol).

IR spectrum data of the solid catalyst component ($cm^{-1}$): 2287, 1697, 1459, 1377, 1311, 1243, 1008.

WDXRF analysis results of the solid catalyst component: Mg: 22.7 wt %, Cl: 74.7 wt %, Ti: 2.2 wt %, and other elements: the balance.

Two propylene polymerizations were carried out according to the propylene polymerization procedures I and II, respectively. The results are shown in Table 2.

Example 11

A spherical solid catalyst component was prepared according to the procedure described in Example 9, except that the diethyl 2,3-diisopropyl-2-cyanosuccinate was replaced with diethyl 3-ethyl-2-isopropyl-2-cyanosuccinate (5 mmol).

IR spectrum data of the solid catalyst component ($cm^{-1}$): 2289, 1699, 1463, 1378, 1321, 1235, 1004.

WDXRF analysis results of the solid catalyst component: Mg: 19.0 wt %, Cl: 77.6 wt %, Ti: 3.2 wt %, and other elements: the balance.

Two propylene polymerizations were carried out according to the propylene polymerization procedures I and II, respectively. The results are shown in Table 2.

Example 12

A spherical solid catalyst component was prepared according to the procedure described in Example 9, except that the diethyl 2,3-diisopropyl-2-cyanosuccinate was replaced with 2-isopropyl-3-phenyl-2-cyanosuccinic acid 1-ethyl ester 4-isobutyl ester (5 mmol).

IR spectrum data of the solid catalyst component ($cm^{-1}$): 2287, 1684, 1637, 1459, 1377, 1313, 1155, 1007.

WDXRF analysis results of the solid catalyst component: Mg: 20.4 wt %, Cl: 76.0 wt %, Ti: 3.4 wt %, and other elements: the balance.

Propylene polymerization was carried out according to the propylene polymerization procedure I. The results are shown in Table 2.

Comparative Example 4

A spherical solid catalyst component was prepared according to the procedure described in Example 9, except that the diethyl 2,3-diisopropyl-2-cyanosuccinate was replaced with diethyl 2,3-diisopropyl succinate (5 mmol).

IR spectrum data of the solid catalyst component ($cm^{-1}$): 1690, 1463, 1377, 1317, 1262, 1010.

WDXRF analysis results of the solid catalyst component: Mg: 23.4 wt %, Cl: 74.1 wt %, Ti: 2.3 wt %, and other elements: the balance.

Two propylene polymerizations were carried out according to the propylene polymerization procedures I and II, respectively. The results are shown in Table 2.

Comparative Example 5

A spherical solid catalyst component was prepared according to the procedure described in Example 9, except that the diethyl 2,3-diisopropyl-2-cyanosuccinate was replaced with ethyl 2-isopropyl-2-cyanoacetate (5 mmol).

IR spectrum data of the solid catalyst component ($cm^{-1}$): 2295, 1705, 1460, 1378, 1319, 1245, 1016.

WDXRF analysis results of the solid catalyst component: Mg: 24.8 wt %, Cl: 73.0 wt %, Ti: 2.1 wt %, and other elements: the balance.

Two propylene polymerizations were carried out according to the propylene polymerization procedures I and II, respectively. The results are shown in Table 2.

Comparative Example 6

A spherical solid catalyst component was prepared according to the procedure described in Example 9, except that the diethyl 2,3-diisopropyl-2-cyanosuccinate was replaced with diethyl 2,3-diisopropyl-2,3-dicyanosuccinate (5 mmol).

Propylene polymerization was carried out according to the propylene polymerization procedure I. The results are shown in Table 2.

Example 13

A spherical solid catalyst component was prepared according to the procedure described in Example 9, except that the diethyl 2,3-diisopropyl-2-cyanosuccinate was replaced with di-isobutyl 2,3-diisopropyl-2-cyanosuccinate (5 mmol).

IR spectrum data of the solid catalyst component ($cm^{-1}$): 2286, 1692, 1460, 1377, 1326, 1290, 1169, 1095, 722.

Two propylene polymerizations were carried out according to the propylene polymerization procedures I and II, respectively. The results are shown in Table 2.

Example 14

A spherical solid catalyst component was prepared according to the procedure described in Example 9, except that the diethyl 2,3-diisopropyl-2-cyanosuccinate was replaced with diethyl 2-cyclopentyl-3-isopropyl-2-cyanosuccinate (5 mmol).

IR spectrum data of the solid catalyst component ($cm^{-1}$): 2290, 1694, 1460, 1377, 1322, 1262, 1057, 723.

Two propylene polymerizations were carried out according to the propylene polymerization procedures I and II, respectively. The results are shown in Table 2.

Example 15

A spherical solid catalyst component was prepared according to the procedure described in Example 9, except that the diethyl 2,3-diisopropyl-2-cyanosuccinate was replaced with diethyl 2-cyclohexyl-3-isopropyl-2-cyanosuccinate (5 mmol).

Two propylene polymerizations were carried out according to the propylene polymerization procedures I and II, respectively. The results are shown in Table 2.

TABLE 2

Performance of the Catalysts

| Example No. | Polymerization Procedure | Polymerization Activity (kgPP/gcat.) | Polymer Isotacticity (%) | Polymer Melt Index (g/10 min) | MWD |
|---|---|---|---|---|---|
| Example 9 | I | 34.0 | 97.6 | 10.9 | 10.1 |
| | II | 16.7 | 96.9 | 30.6 | 10.5 |
| Comparative Example 3 | I | 35.8 | 97.9 | 10.6 | 5.5 |
| | II | 39.0 | 97.1 | 28.0 | 5.7 |
| Example 10 | I | 13.4 | 95.2 | 24.7 | 6.7 |
| | II | 12.1 | 95.4 | 45.3 | 6.3 |
| Example 11 | I | 12.0 | 96.2 | 26.4 | 7.1 |
| | II | 12.5 | 95.6 | 48.4 | 7.2 |
| Example 12 | I | 13.4 | 90.2 | 40.7 | 7.5 |
| Comparative Example 4 | I | 34.0 | 96.7 | 10.5 | 8.4 |
| | II | 30.4 | 95.8 | 17.3 | 8.4 |
| Comparative Example 5 | I | 10.0 | 89.5 | 33.8 | 8.1 |
| | II | 8.2 | 87.5 | 63.2 | 8.5 |
| Comparative Example 6 | I | 16.6 | 85.3 | 72.2 | / |
| Example 13 | I | 27.0 | 95.8 | 7.1 | 9.2 |
| | II | 33.6 | 95.0 | 12.8 | 10.0 |
| Example 14 | I | 29.0 | 97.0 | 2.1 | 11.1 |
| | II | 33.6 | 96.4 | 14.6 | 13.6 |
| Example 15 | I | 44.9 | 97.0 | 1.9 | 11.7 |
| | II | 42.1 | 95.1 | 19.8 | 12.7 |

It can be seen from the data shown in Table 2 that the catalysts of examples in accordance with the present disclosure exhibited good overall performance, including activities for propylene polymerization, isotacticities of the resultant polymers, and molecular weight distribution of the polymers. For example, the polymers obtained by using the catalyst of Example 9, which comprised diethyl 2,3-diisopropyl-2-cyanosuccinate as an internal electron donor, had molecular weight distribution at least as good as that of the polymers obtained by using the catalyst of Comparative Example 4, which comprised diethyl 2,3-diisopropyl succinate as an internal electron donor. In addition, regarding the catalyst of Comparative Example 5, which comprised ethyl 2-isopropyl-2-cyanoacetate as an internal electron donor, see the catalytic activities, and the isotactic indices of the resultant polymers.

Example 16

A spherical magnesium dichloride-alcohol adduct of formula $MgX_2 \cdot (ROH)_m$, wherein X=Cl, R=$C_2H_5$, and m=2.4, was prepared according to the process described in Example 1 of Chinese patent application CN1091748A.

To a 300 ml jacketed glass reactor was charged 100 ml of titanium tetrachloride, and the contents were cooled to −20° C. 8 g of the above spherical magnesium dichloride-alcohol adduct was added thereto, and the contents were heated to 100° C., with 2.5 mmol of diethyl 2,3-diisopropyl-2-cyanosuccinate and 2.5 mmol of diisobutyl phthalate being added thereto during the heating. The reaction mixture was maintained at 100° C. for 1 hour, and then the liquid was filtered off. The residual solids were washed with titanium tetrachloride twice and with hexane four times, and then dried under vacuum, to give a spherical solid catalyst component.

IR spectrum data of the solid catalyst component ($cm^{-1}$): 2291, 1701, 1459, 1378, 1298, 1008.

WDXRF analysis results of the solid catalyst component: Mg: 22.0 wt %, Cl: 75.2 wt %, Ti: 2.7 wt %, and other elements: the balance.

Two propylene polymerizations were carried out according to the propylene polymerization procedures I and II, respectively. The results are shown in Table 3 below.

Example 17

A spherical solid catalyst component was prepared according to the procedure described in Example 16, except that the diisobutyl phthalate (2.5 mmol) was replaced with 9,9-bis(methoxymethyl)fluorene (2.5 mmol).

IR spectrum data of the solid catalyst component ($cm^{-1}$): 2286, 1697, 1637, 1460, 1377, 1294, 1009.

WDXRF analysis results of the solid catalyst component: Mg: 21.8 wt %, Cl: 74.8 wt %, Ti: 3.0 wt %, and other elements: the balance.

Two propylene polymerizations were carried out according to the propylene polymerization procedures I and II, respectively. The results are shown in Table 3.

Example 18

A spherical solid catalyst component was prepared according to the procedure described in Example 16, except that the diisobutyl phthalate (2.5 mmol) was replaced with ethyl 2-methoxybenzoate (2.5 mmol).

IR spectrum data of the solid catalyst component ($cm^{-1}$): 2290, 1693, 1638, 1458, 1377, 1297, 1008.

WDXRF analysis results of the solid catalyst component: Mg: 22.9 wt %, Cl: 74.2 wt %, Ti: 2.6 wt %, and other elements: the balance.

Two propylene polymerizations were carried out according to the propylene polymerization procedures I and II, respectively. The results are shown in Table 3.

Example 19

A spherical solid catalyst component was prepared according to the procedure described in Example 16, except that the diisobutyl phthalate (2.5 mmol) was replaced with 2-isopentyl-2-isopropyl-1,3-dimethoxypropane (2.5 mmol).

IR spectrum data of the solid catalyst component ($cm^{-1}$): 2290, 1693, 1638, 1458, 1377, 1297, 1008.

WDXRF analysis results of the solid catalyst component: Mg: 22.9 wt %, Cl: 74.2 wt %, Ti: 2.6 wt %, and other elements: the balance.

Two propylene polymerizations were carried out according to the propylene polymerization procedures I and II, respectively. The results are shown in Table 3 below.

Comparative Example 7

A spherical solid catalyst component was prepared according to the procedure described in Comparative Example 3, except that the diisobutyl phthalate was replaced with ethyl 2-methoxybenzoate (5 mmol).

Propylene polymerization was carried out according to the propylene polymerization procedure I. The results are shown in Table 3.

TABLE 3

Performance of the Catalysts

| Example No. | Polymerization Procedure | Polymerization Activity (kgPP/gcat.) | Polymer Isotacticity (%) | Polymer Melt Index (g/10 min) | Polymer Molecular Weight Mw ($\times 10^5$) | MWD |
|---|---|---|---|---|---|---|
| Example 16 | I | 42.1 | 96.0 | 11.3 | 3.19 | 10.1 |
|  | II | 45.7 | 95.9 | 18.6 | 3.00 | 9.0 |
| Example 17 | I | 56.0 | 95.6 | 9.5 | 3.35 | 8.1 |
|  | II | 64.0 | 95.0 | 37.3 | 2.39 | 9.6 |
| Example 18 | I | 29.3 | 97.8 | 0.3 | 7.12 | 13.1 |
|  | II | 32.4 | 95.0 | 12.4 | 3.30 | 12.8 |
| Example 19 | I | 46.6 | 97.2 | 6.3 | 4.19 | 11.9 |
|  | II | 62.2 | 96.6 | 37.3 | 2.71 | 8.0 |
| Comparative Example 3 | I | 35.8 | 97.9 | 10.6 | 2.35 | 5.5 |
|  | II | 39.0 | 97.1 | 28.0 | 2.19 | 5.7 |
| Comparative Example 7 | I | 41.7 | 82.5 | 12.1 | \ | 7.9 |

It can be seen from the data shown in Table 3 that the catalysts of the examples in accordance with the present disclosure, which comprised a combination of two internal electron donor compounds, generally exhibited good activities and good hydrogen response, and the resultant polymers generally exhibited good isotacticities and good molecular weight distribution. The performance of the catalysts of the examples in accordance with the present disclosure can facilitate the preparation of propylene polymers and the development of grades of polymers.

What is claimed is:

1. A catalyst component for olefin polymerization, comprising magnesium, titanium, at least one halogen, and at least one internal electron donor, wherein the at least one internal electron donor in the catalyst component is chosen from an α-cyanosuccinate compound of formula (I):

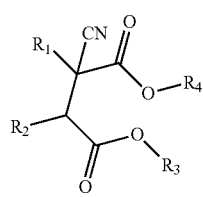

(I)

wherein $R_1$ and $R_2$, which may be the same or different, are each chosen from hydrogen, $C_1$-$C_{14}$ linear alkyl, $C_3$-$C_{14}$ branched alkyl, $C_3$-$C_{10}$ cycloalkyl, $C_6$-$C_{10}$ aryl, $C_7$-$C_{10}$ alkaryl, and $C_7$-$C_{10}$ aralkyl groups; and $R_3$ and $R_4$, which may be the same or different, are each chosen from $C_1$-$C_{10}$ linear alkyl, $C_3$-$C_{10}$ branched alkyl, $C_3$-$C_{10}$ cycloalkyl, $C_6$-$C_{20}$ aryl, $C_7$-$C_{20}$ alkaryl, and $C_7$-$C_{20}$ aralkyl groups, and a combination of at least one α-cyanosuccinate compound of formula (I) and at least one monofunctional or difunctional compound E chosen from esters other than the α-cyanosuccinate compound of formula (I), ethers, ketones, ketals, amines, and silanes.

2. The catalyst component of claim 1, which is obtained by a process comprising (1) dissolving at least one magnesium halide in a solvent system comprising at least one organic epoxy compound, at least one organophosphorus compound and at least one optional inert diluent, to form a solution A;

(2) combining the solution A with at least one titanium compound and at least one auxiliary precipitant, to form a mixture B;

(3) precipitating a solids C from the mixture B;

(4) separating a solids D from the product of operation (3); and (5) treating the solids D with at least one titanium compound in at least one inert organic solvent at least once, to obtain the catalyst component, wherein the internal electron donor is introduced at any stage before the separation of operation (4), wherein the molar ratio of the magnesium halide to the titanium compound to the internal electron donor, used in the process, is 1-200:20-4000:1;

and wherein in the case where the at least one internal electron donor is chosen from a combination of at least one α-cyanosuccinate compound of formula (I) and at least one monofunctional or difunctional compound E, the α-cyanosuccinate compound of formula (I) is in an amount ranging from 5 mol % to 95 mol % of the combination.

3. The catalyst component of claim 2, wherein the molar ratio of the magnesium halide to the titanium compound to the internal electron donor, used in the process, is 5-100:50-2000:1, and wherein in the case where the at least one internal electron donor is chosen from a combination of at least one α-cyanosuccinate compound of formula (I) and at least one monofunctional or difunctional compound E, the α-cyanosuccinate compound of formula (I) is in an amount ranging from 50 mol % to 95 mol % of the combination.

4. The catalyst component of claim 1, comprising a reaction product of at least one magnesium halide-alcohol adduct, at least one titanium compound and the at least one internal electron donor, wherein the magnesium halide-alcohol adduct is of formula (II):

$$MgX_2 \cdot (ROH)_m \qquad (II)$$

wherein X is chlorine or bromine, R, which may be the same or different, is each chosen from $C_1$-$C_{12}$ alkyl, $C_3$-$C_{10}$ cycloalkyl and $C_6$-$C_{10}$ aryl groups, and m is from 1 to 5.

5. The catalyst component of claim 4, wherein in the formula (II), R is chosen from $C_1$-$C_4$ alkyl groups, X is chlorine, and m is from 1.5 to 3.5.

6. The catalyst component of claim 4, wherein the molar ratio of the magnesium halide-alcohol adduct to the titanium compound to the internal electron donor, used in the reaction to form the solid catalyst component, in terms of Mg:Ti: internal electron donor is 1-200:20-4000:1; and wherein in the case where the at least one internal electron donor is chosen from a combination of at least one α-cyanosuccinate compound of formula (I) and at least one monofunctional or difunctional compound E, the α-cyanosuccinate compound of formula (I) is in an amount ranging from 5 mol % to 95 mol % of the combination.

7. The catalyst component of claim 6, wherein the molar ratio of the magnesium halide-alcohol adduct to the titanium compound to the internal electron donor, used in the reaction to form the solid catalyst component, in terms of Mg:Ti: internal electron donor is 5-100:50-2000:1; and wherein in the case where the internal electron donor is chosen from a combination of the at least one α-cyanosuccinate compound of formula (I) and at least one monofunctional or difunctional compound E, the α-cyanosuccinate compound of formula (I) is in an amount ranging from 50 mol % to 95 mol % of the combination.

8. The catalyst component of claim 1, wherein the at least one titanium compound is chosen from compounds of formula $Ti(OR^5)_{4-n}X_n$, wherein $R^5$, which may be the same or different, is each chosen from $C_1$-$C_{20}$ hydrocarbyl groups, X, which may be the same or different, is each chosen from F, Cl and Br, and n is an integer ranging from 1 to 4.

9. The catalyst component of claim 8, wherein in the formula $Ti(OR^5)_{4-n}X_n$, $R^5$ is chosen from $C_1$-$C_{14}$ aliphatic hydrocarbyl groups.

10. The catalyst component of claim 1, wherein in the formula (I), $R_1$ to $R_4$ are each chosen from $C_1$-$C_4$ linear alkyl, $C_3$-$C_4$ branched alkyl and $C_3$-$C_6$ cycloalkyl groups.

11. The catalyst component of claim 1, wherein in the formula (I), $R_1$ and $R_2$ are each chosen from methyl, ethyl, n-propyl, isopropyl, n-butyl, isobutyl, n-pentyl, isopentyl, n-hexyl, cyclopentyl, cyclohexyl, phenyl, benzyl, p-methylphenylmethyl, and phenylethyl groups; and $R_3$ and $R_4$ are each chosen from methyl, ethyl, n-propyl, isopropyl, n-butyl, isobutyl, phenyl, p-methylphenyl, o-methylphenyl, m-methyl phenyl, and benzyl groups.

12. The catalyst component of claim 1, wherein the α-cyanosuccinate compound of formula (I) is chosen from diethyl 2,3-diisopropyl-2-cyanosuccinate, di-n-butyl 2,3-diisopropyl-2-cyanosuccinate, diisobutyl 2,3-diisopropyl-2-cyanosuccinate, diethyl 2,3-dicyclopentyl-2-cyanosuccinate, di-n-butyl 2,3-dicyclopentyl-2-cyanosuccinate, diisobutyl 2,3-dicyclopentyl-2-cyanosuccinate, diethyl 2,3-dicyclohexyl-2-cyanosuccinate, di-n-butyl 2,3-dicyclohexyl-2-cyanosuccinate, diisobutyl 2,3-dicyclohexyl-2-cyanosuccinate, diethyl 2-cyclopentyl-3-isopropyl-2-cyanosuccinate, 2,3-diisopropyl-2-cyanosuccinic acid 1-isobutyl ester 4-ethyl ester, 2,3-diisopropyl-2-cyanosuccinic acid 1-n-butyl ester 4-ethyl ester, diethyl 2-isopropyl-3-methyl-2-cyanosuccinate, diethyl 3-ethyl-2-isopropyl-2-cyanosuccinate, diethyl 2-isopropyl-3-propyl-2-cyanosuccinate, diethyl 3-butyl-2-isopropyl-2-cyanosuccinate, diethyl 2-isopropyl-3-phenyl-2-cyanosuccinate, diethyl 2-cyclohexyl-3-isopropyl-2-cyanosuccinate, and 2-isopropyl-3-phenyl-2-cyanosuccinic acid 1-ethyl ester 4-isobutyl ester.

13. The catalyst component of claim 1, wherein the compound E is chosen from esters of mono- and poly-carboxylic acids, diether compounds, and difunctional compounds comprising both an ether group and an ester group.

14. The catalyst component of claim 13, wherein the compound E is chosen from 2,2-dihydrocarbyl malonates, 2,3-dihydrocarbyl succinates, glutarates, phthalates, and 1,3-diether compounds of formula (IV):

(IV)

wherein $R_I$, $R_{II}$, $R_{III}$, $R_{IV}$, $R_V$, and $R_{VI}$, which may be the same or different, are each chosen from hydrogen, halogens, linear $C_1$-$C_{20}$ alkyl groups and branched $C_3$-$C_{20}$ alkyl groups, $C_3$-$C_{20}$ cycloalkyl groups, $C_6$-$C_{20}$ aryl groups, $C_7$-$C_{20}$ alkaryl groups, and $C_7$-$C_{20}$ aralkyl groups, $R_{III}$ and $R_{IV}$ are optionally linked to each other to form a ring; and $R_{VII}$ and $R_{VIII}$, which may be the same or different, are each chosen from linear $C_1$-$C_{20}$ alkyl groups, $C_3$-$C_{20}$ branched alkyl groups, and $C_3$-$C_{20}$ cycloalkyl groups.

15. The catalyst component of claim 14, wherein the 1,3-diether compound is chosen from 9,9-bis(methoxymethyl) fluorene and 2-isopentyl-2-isopropyl-1,3-dimethoxypropane.

16. The catalyst component of claim 1, wherein the compound E is ethyl o-methoxybenzoate.

17. The catalyst component of claim 1, wherein said component has an IR spectrum having a characteristic absorption peak T in a range of from 2240 $cm^{-1}$ to 2345 $cm^{-1}$.

18. The catalyst component of claim 1, wherein said component has an IR spectrum having a characteristic absorption peak T in a range of from 2240 $cm^{-1}$ to 2295 $cm^{-1}$.

19. A catalyst for the polymerization of at least one olefin of formula $CH_2=CHR$, wherein R is chosen from hydrogen and alkyl groups comprising from 1 to 6 carbon atoms, comprising a reaction product of:
(1) at least one catalyst component of claim 1;
(2) at least one alkyl aluminum compound; and
(3) optionally, at least one external electron donor compound, wherein said reaction product is said catalyst.

20. The catalyst of claim 19, having at least one of the following:
the at least one alkyl aluminum compound is of formula $AlR^7_{3-a}X^1_a$, wherein $R^7$, which may be the same or different, is each chosen from hydrogen and $C_1$-$C_{20}$ hydrocarbyl groups; $X^1$, which may be the same or different, is chosen from halogens; and a has a value ranging from 0 to 2;
the at least one alkyl aluminum compound is used in such an amount that a molar ratio of aluminum therein to titanium in the catalyst component ranges from 5:1 to 5000:1;
the at least one external electron donor compound is chosen from carboxylic anhydrides, carboxylic esters, ketones, ethers, lactones, organophosphorus compounds, and organic silicon compounds of formula $R^8_a R^9_b Si$ $(OR^{10})_c$, wherein a and b, which may be the same or different, are each an integer ranging from 0 to 2, c is an integer ranging from 1 to 3, and the sum of (a+b+c) is 4; $R^8$, $R^9$ and $R^{19}$, which may be the same or different, are each chosen from $C_1$-$C_{18}$ hydrocarbyl groups, optionally comprising at least one heteroatom;

the at least one external electron donor compound is used in an amount ranging from 0.005 to 0.5 moles, relative to one mole of the at least one alkyl aluminum compound; or the at least one alkyl aluminum compound and the optional at least one external electron donor compound contact and/or react with the solid catalyst component separately or as a mixture.

21. A process for polymerizing at least one olefin, comprising contacting at least one olefin of formula $CH_2$=CHR, wherein R is chosen from hydrogen and alkyl groups comprising from 1 to 6 carbon atoms, optionally at least one other olefin as a comonomer, and optionally at least one diene as a second comonomer, with the catalyst of claim 19 under polymerization conditions; and recovering the resulting polymer.

\* \* \* \* \*

UNITED STATES PATENT AND TRADEMARK OFFICE
CERTIFICATE OF CORRECTION

| | |
|---|---|
| PATENT NO. | : 8,541,333 B2 |
| APPLICATION NO. | : 12/856175 |
| DATED | : September 24, 2013 |
| INVENTOR(S) | : Lunjia Xie et al. |

It is certified that error appears in the above-identified patent and that said Letters Patent is hereby corrected as shown below:

In the claims:

Claim 20, col. 23, line 13, "react with the solid catalyst compound" should read -- react with the catalyst component --.

Signed and Sealed this
Seventeenth Day of December, 2013

Margaret A. Focarino
*Commissioner for Patents of the United States Patent and Trademark Office*